United States Patent [19]

Stone et al.

[11] 3,802,020

[45] Apr. 9, 1974

[54] MOBILE FIELD BURNER

[76] Inventors: Raymond E. Stone, 555 E. 50th, Eugene, Oreg. 97405; Robert D. Coakley, Rt. 2 Box 1155, Roseburg, Oreg. 97470

[22] Filed: Dec. 27, 1972

[21] Appl. No.: 318,746

[52] U.S. Cl. .......................... 15/4, 15/84, 47/1.42, 110/8 R, 126/271.3
[51] Int. Cl. ............................................. F23g 9/00
[58] Field of Search ..................... 15/4, 84; 47/1.42; 110/8 R, 119; 126/271.2, 271.3

[56] References Cited
UNITED STATES PATENTS

| | | | |
|---|---|---|---|
| 1,826,232 | 10/1931 | Young | 126/271.3 |
| 2,986,841 | 6/1961 | MacDonald | 47/1.42 |
| 3,026,551 | 3/1962 | Smith | 15/4 |

*Primary Examiner*—Edward L. Roberts
*Attorney, Agent, or Firm*—Daniel P. Chernoff; Jacob E. Vilhauer, Jr.

[57] ABSTRACT

A mobile burner for sterilizing and decontaminating seed grass fields without thereby causing excessive air pollution. The mobile burner apparatus comprises a vehicular structure having a combustion chamber and means for collecting and conveying to the chamber the loose seed grass remaining on the ground after harvest. Impingement means are provided for directing some of the hot combustion gases from the chamber into the soil as the burner traverses the field, to burn the short grass and any remaining loose seed grass and destroy weed seed and vermin in preparation for planting of the next crop. The flue system of the combustion chamber is equipped with a group of cyclones for cleaning at least a major portion of the combustion gases before their emission into the atmosphere by separating the dirt, cinders and other particulate material from the gases and distributing the separated solids on the ground. A system for recirculating a portion of the gases through the combustion chamber is provided to promote efficiency of the system.

16 Claims, 3 Drawing Figures

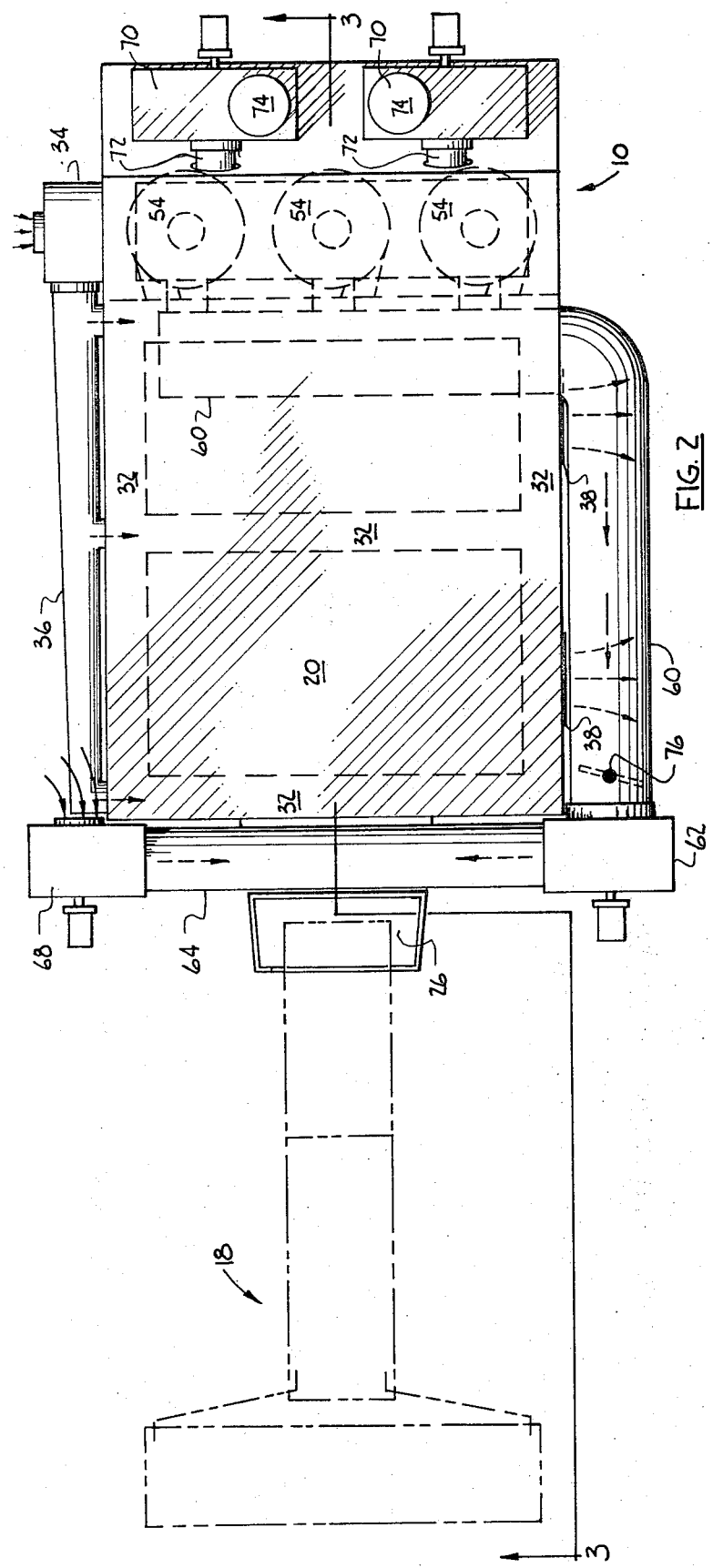
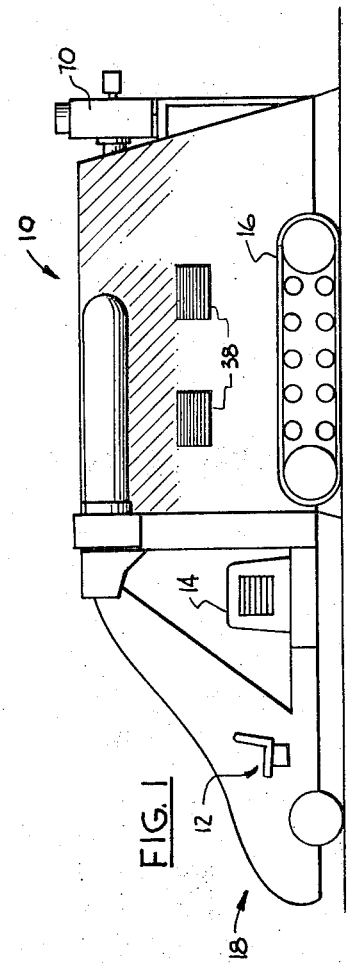
FIG. 2
FIG. 1

MOBILE FIELD BURNER

BACKGROUND OF THE INVENTION

This invention relates to a mobile field burner for decontaminating and sterilizing seed grass fields after harvest. More particularly the invention comprises a vehicular combustion chamber for burning the loose seed grass, including a combustion gas cleansing system for minimizing air pollution and further including means for utilizing the heat of combustion to purify the ground.

It is a prevailing practice in the grass seed producing regions of the United States to burn the fields after harvest, the primary objective being to sterilize and decontaminate the field by removing all traces not only of the previous crop but also of the weed seed and vermin which are inevitably present. Such practice is required in order to insure that the variety of grass seed next produced from the field will be pure, without strains of the previous seed variety and without the presence of any other contaminating influences affecting the crop. Unfortunately, the current practice of setting the fields afire to accomplish this objective has caused severe air pollution in the surrounding areas by virtue of the enormous quantities of cinders, dirt and other solids emitted into the atmosphere by open field burning. The residents of nearby cities and towns have been so adversely affected by the resultant layer of thick smog, lasting sometimes for days, that local air pollution control authorities have been forced to restrict field burning to periods of optimum weather conditions. The results of such restriction, however, have been satisfactory neither to the seed growers nor to the inhabitants of the nearby communities, and controversy accordingly continues to rage over whether or not the practice should be eliminated altogether by appropriate legislation. Since such elimination would have a severe adverse economic effect on the growers, a great need currently exists in the grass seed industry for apparatus capable of conducting the purifying and decontaminating functions of field burning without causing the excessive air pollution presently resulting from such practice.

SUMMARY OF THE PRESENT INVENTION

The present invention is directed to a mobile field burner capable of serving the needs of both the seed growers and the inhabitants of areas proximate to the seed growing regions of the country. The invention comprises a vehicle, which may be either self-propelled or towed, having a mobile combustion chamber adaptable for receiving loose seed grass and simultaneously burning such grass as the vehicle traverses the field. The vehicle includes adjustably regulated impingement means for directing a portion of the hot combustion gases into the soil beneath the vehicle, so as to perform the sterilization and decontamination functions described above. Means for cleaning at least a major portion of the flue gases to remove cinders, dirt and other solids prior to the escape of the gases into the atmosphere are also provided, preferably by virtue of a cyclone system which separates the solids and distributes them on the ground beneath the vehicle as it traverses the field. The area beneath the vehicle, particularly where the inpingement of the hot combustion gases on the soil takes place, is preferably shrouded with appropriate skirting to limit, as much as possible, the escape of particulate matter into the air resulting from the turbulence created by the treatment of the soil. Partial recirculation of the flue gases is provided to enhance the efficiency of the combustion process.

The provision of a vehicular combustion chamber for receiving and burning loose seed grass as the vehicle advances across the field, coupled with flue gas cleansing means and impingement means for directing the hot combustion gases into the soil, is essentially the combination of features enabling the apparatus to perform the dual functions of soil sterilization and pollution control. In addition, the practice of enclosed burning and impingement made possible by use of the present invention tends to utilize the heat of combustion to a much more efficient extent than does the present practice of open field burning, thereby enhancing the soil sterilization function. The provision of adjustable regulating means for controlling the flow of combustion gases directed into the soil, dependent upon the attainment of desired purifying temperatures, further insures proper sterilization of the field under varying combustion condition.

The foregoing and other objectives, features and advantages of the present invention will be more readily understood upon consideration of the following detailed description of the invention, taken in conjunction with the accompanying drawings.

BRIEF DESCRIPTION OF THE DRAWINGS

FIG. 1 is a side elevation view of a simplified self-propelled embodiment of the mobile field burner.

FIG. 2 is an enlarged simplified top view of the mobile burner.

DESCRIPTION OF THE PREFERRED EMBODIMENT

Figure 3:
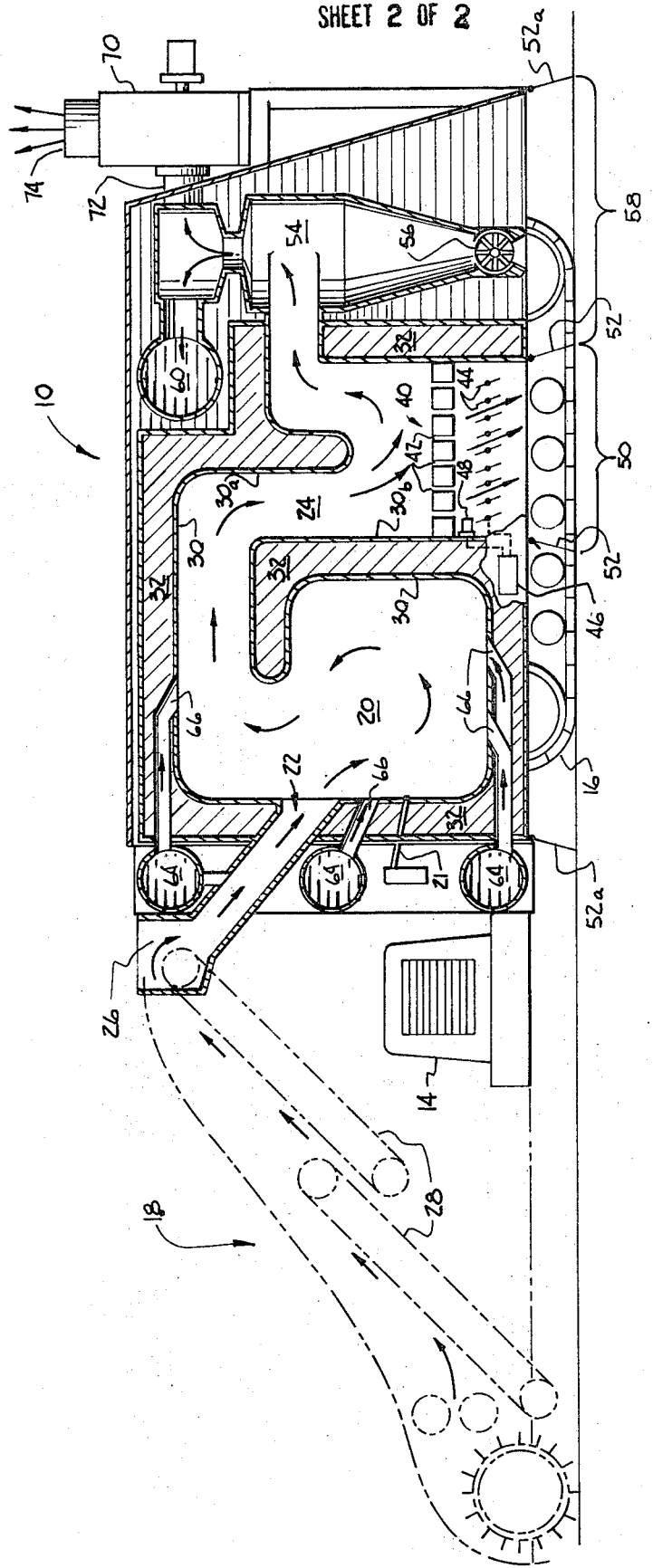
FIG. 3 is a partially schematic cross-sectional view of the internal components of the mobile burner, taken along lines 3—3 of FIG. 2.

The self-propelled embodiment of the mobile field burner comprises a vehicular structure 10 having an operator's station 12 and an engine 14 for driving a pair of crawler tracks 16. Mounted within the vehicle 10 is a forced-air combustion chamber 20 having a suitable propane pilot light 21, a fuel inlet port 22 through which is fed vegetable matter such as loose seed grass, and an exhaust conduit 24 which conducts the hot combustion gases away from the chamber 20. A mechanism designated generally as 18 is attached to the front of the vehicle 10 for collecting the loose seed grass or other vegetable matter from the ground and conveying it upwardly to the entrance 26 of the fuel inlet port 22. The collecting mechanism may be of any conventional design currently available on the market, for example a Hesston or John Deere cycle bar, pickup, conditioner and wind rower of the type having upwardly inclined conveyors such as 28 or, alternatively, a tractor-powered rotary mower with a blower (not shown).

The walls 30 of the combustion chamber 20 and exhaust conduit 24 respectively are preferably constructed of a stainless steel inner shell with a segmented, high-alumina castable refractory liner. To insure against excessive heat build-up, the walls 30 are of hollow construction defining a cooling plenum chamber 32 within. Connected to the plenum chamber 32 is a forced air cooling system comprising a fan 34 (FIG.

2) which draws air from the outisde and forces the air through a duct 36 and thence through the various branches of the plenum chamber 32 and out the exhaust vents 38, thereby establishing an internal transverse cross-flow of forced cooling air.

Communicating with the exhaust conduit 24 is a perforated refractory grate 40 having a group of downwardly facing ports 42 formed therein for permitting a portion of the hot combustion gases to escape from the conduit 24. In this connection the wall portions 30a and 30b of the conduit 24 are formed so as to divert the combustion gases downwardly in the region of the grate 40 to promote their passage through the ports 42. Below the grate 40 is an array of adjustable louvers 44 which may be either manually adjustable or adjustable by means of an operator-actuated remote power controller 46 of any suitable design such as, for example, a hydraulic cylinder. When the louvers 44 are closed, little or no flow of combustion gases through the ports 42 is permitted. However, with the louvers open to their position as shown in FIG. 3, the hot combustion gases escaping through the ports 42 are directed downwardly to impinge on the soil beneath the vehicle 10 as it traverses the field to thereby sterilize and decontaminate the soil.

Located adjacent the impingement means 40, 44 is a temperature sensor 48 for measuring the temperature of the combustion gases. In its simplest form, the temperature sensor 48 may merely be coupled to a temperature gauge located at the operator's station, so that the operator may know the temperature of the gases in the impingement area and adjust the louvers 44 accordingly. Alternatively, the temperature sensor 48 might be coupled with the power controller 46 as shown in FIG. 3, with the controller 46 being adaptable for adjusting the louvers 44 automatically in response to the temperature of the combustion gases. In either case, a major objective of the adjustable louvers 44 and the temperature sensor 48 is to permit the closure of the louvers 44 when the temperature of the combustion gases is too low for effective soil sterilization, as for example might occur during initial warm-up of the burner. Once the temperature of the combustion gases has reached a minimum limit as indicated by the temperature sensor 48, say 400°F., the louvers 44 may be opened either manually or automatically in response to the temperature as described above, and the impingement process permitted to begin. After warm-up further flow regulation of the combustion gases through ports 42 may be desirable depending upon the particular application of the burner, and in such case the louvers 44 may be adjusted accordingly to accomplish such flow regulation.

The area of impingement of the hot combustion gases upon the soil beneath the vehicle 10, designated generally as 50 in FIG. 3, is shrouded by skirts 52 extending downwardly from the vehicle 10 into close proximity with the soil so as to substantially shield the impingement area 50 from the surrounding air. The resultant isolation of the impingement area 50 serves to prevent cinders, dirt and other particulate matter present in the combustion gases, or stirred up from the soil by the turbulence of the impinging gases, from escaping into the outside air and thus limits the atmospheric pollution which might otherwise occur.

Because of the high efficiency of the enclosed burner system, which retains the majority of the heat developed from the combustion of the vegetable matter, it is unnecessary for adequate soil purification that all of the combustion gases be directed into the soil through the impingement means 40, 44. Rather a major portion of the combustion gases may remain in the conduit 24 where they are permitted to flow downstream into a group of cleansing cyclones 54 which separate most of the cinders, dirt and other particulate matter from the gases. The particulate matter which accumulates in the cyclones 54 is disposed of through a group of rotary valves such as 56 which distribute the particulate matter onto the ground in the area 58 beneath the vehicle 10. Additional skirting such as 52a shields the distributing area 58 from the surrounding air to further reduce atmospheric pollution.

The cleansed combustion gases escaping upwardly from the cyclones 54 may be exhausted in either of two directions. A recirculating conduit 60 is provided having a fan 62 for drawing a portion of the combustion gases and forcing them back into the combustion chamber 20 through a group of feeder ducts 64 which communicate with the interior of the chamber 20 through a series of ports 66 formed in the walls 30 of the chamber. The recirculating combustion gases are mixed with fresh incoming combustion air drawn from the oustide through fan 68 and forced into the same feeder ducts 64 from the opposite side. The recirculation of combustion gases is particularly helpful during the warm-up period of the burner, where heat must be conserved to insure that the combustion gases will quickly attain the temperatures needed for effective soil sterilization. In addition, the recirculation and resultant heat conservation also serves to maintain efficiency of the burner throughout the combustion process by maintaining high combustion chamber temperatures to compensate for varying conditions of the seed grass fuel, for example to promote efficient burning of wet grass as well as dry grass. The portion of the combustion gases emerging from the cyclones 54 which is not recirculated back to the combustion chamber is drawn by means of fans 70 through conduits 72 and emitted to the atmosphere through exhaust ports 74. Because of the cleansing function provided by the cyclones 54 in advance of such emission, the gaseous effluent is relatively free of polluting substances.

In order to provide means for controllably proportioning the flow of combustion gases between the recirculating conduit 60 and the exhaust ports 74, it may be desirable to provide adjustable flow proportioning means such as a damper 76 in the recirculating conduit 60 (FIG. 2), so that the degree of recirculation can be increased in response to low temperature in the combustion chamber and decreased when the temperature rises above predetermined levels. Other appropriately located temperature sensors, possibly coupled with automatic power controllers for regulating such flow proportioning means, might be useful for this purpose.

Sufficient suction is imposed by the combination of fans 62 and 70 to insure that a decreasing pressure gradient exists in the exhaust conduit 24 downstream of the impingement means 40, 44 to insure that a major portion of the combustion gases will be drawn into the cyclones 54 rather than being emitted through the impingement means 40, 44. In this connection it should be noted that the suction created by fans 62 and 70 tends to counteract partially the influence created by the shape of the walls 30a, 30b of the exhaust conduit 24 in the area directly above the grate 40 where the conduit tends to divert the combustion gases in a direction aligned with the ports 42 in the grate.

The terms and expressions which have been employed in the foregoing abstract and specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A vehicular mobile field burner for purifying and decontaminating the soil of an agricultural field by applying heat thereto as said burner traverses said field, said vehicular burner comprising:
   a. a combustion chamber having an inlet port for receiving vegetable matter collected from said field and having an exhaust conduit for conducting combustion gases from said chamber;
   b. cleansing means communicating with said exhaust conduit for removing particulate matter from at least a portion of said combustion gases prior to their emission into the atmosphere; and
   c. impingement means communicating with said exhaust conduit for directing at least a portion of said combustion gases onto the soil as said vehicular burner traverses said field.

2. The vehicular burner of claim 1 wherein means are provided communicating with said inlet port of said combustion chamber for collecting vegetable matter from said field and conveying said vegetable matter to said inlet port as said burner traverses said field.

3. The vehicular burner of claim 1 wherein said impingement means includes adjustable means for regulating the flow of said combustion gases directed onto said soil.

4. The vehicular burner of claim 3 wherein a temperature sensor is provided adjacent said impingement means for measuring the temperature of said combustion gases.

5. The vehicular burner of claim 4 including control means coupled with said adjustable gas flow regulating means and with said temperature sensor for controlling said flow of combustion gases directed onto said soil in response to said combustion gas temperature.

6. The vehicular burner of claim 5 wherein said control means includes means for closing said regulating means so as to prevent the impingement of said combustion gases upon said soil whenever the temperature of said combustion gases as measured by said temperature sensor is below a predetermined temperature.

7. The vehicular burner of claim 3 wherein said impingement means comprises a group of downwardly facing ports and wherein said adjustable gas flow regulating means comprises an array of adjustable louvers in proximity with said ports for regulating the flow of combustion gases through said ports.

8. The vehicular burner of claim 1 wherein shroud means are provided extending from said vehicular burner downwardly into proximity with the soil for substantially shielding the area of impingement of said combustion gases on said soil from the surrounding atmosphere.

9. The vehicular burner of claim 1 wherein said combustion gas cleansing means communicates with said exhaust conduit at a location downstream, in the direction of flow of said combustion gases through said conduit, from the location where said impingement means communicates with said exhaust conduit.

10. The vehicular burner of claim 1 wherein said combustion gas cleansing means comprises cyclone means for separating said particulate matter from said combustion gases, said cyclone means having means adjacent its bottom portion for distributing said separated particulate matter downwardly onto the soil as said burner traverses said field.

11. The vehicular burner of claim 10 including shroud means extending downwardly from said burner into proximity with the soil for substantially shielding the area of distribution of said separated particulate matter from the surrounding atmosphere.

12. The vehicular burner of claim 1 wherein means are provided communicating with said exhaust conduit for recirculating at least a portion of said combustion gases through said combustion chamber.

13. The vehicular burner of claim 1 including suction means communicating with said exhaust conduit at a location downstream, in the direction of flow of said combustion gases through said conduit, from the location where said impingement means communicates with said exhaust conduit, so as to maintain a decreasing pressure gradient in said conduit in a downstream direction from said impingement means.

14. The vehicular burner of claim 1 wherein the walls of said combustion chamber are hollow so as to define a cooling plenum chamber therein, and wherein means are provided for forcing cooling air through said plenum chamber.

15. The vehicular burner of claim 1 wherein said combustion chamber includes a plurality of ports in its walls and wherein means are provided for forcing air through said ports into said chamber to support combustion therein.

16. A mobile field burner for purifying and decontaminating the soil of an agricultural field by applying heat thereto, said burner comprising:
   a. a vehicular supporting structure;
   b. a combustion chamber mounted on said vehicular structure having a fuel inlet port and an exhaust conduit for conducting combustion gases from said chamber;
   c. means for collecting vegetable matter from said field as said vehicular structure traverses said field, including means for conveying said collected vegetable matter to said fuel inlet port of said combustion chamber;
   d. downwardly facing impingement means communicating with said exhaust conduit for directing at least a portion of said combustion gases from said exhaust conduit onto the ground beneath said mobile burner, said impingement means including adjustable means for regulating the flow of said gases directed onto the ground;
   e. combustion gas cleansing means communicating with said exhaust conduit at a location downstream from said impingement means for separating particulate matter from at least a portion of said combustion gases and distributing said particulate matter on the ground; and
   f. an exhaust port communicating with said exhaust conduit at a location downstream from said gas cleansing means for permitting said cleansed combustion gases to be emitted into the atmosphere.

* * * * *